UNITED STATES PATENT OFFICE.

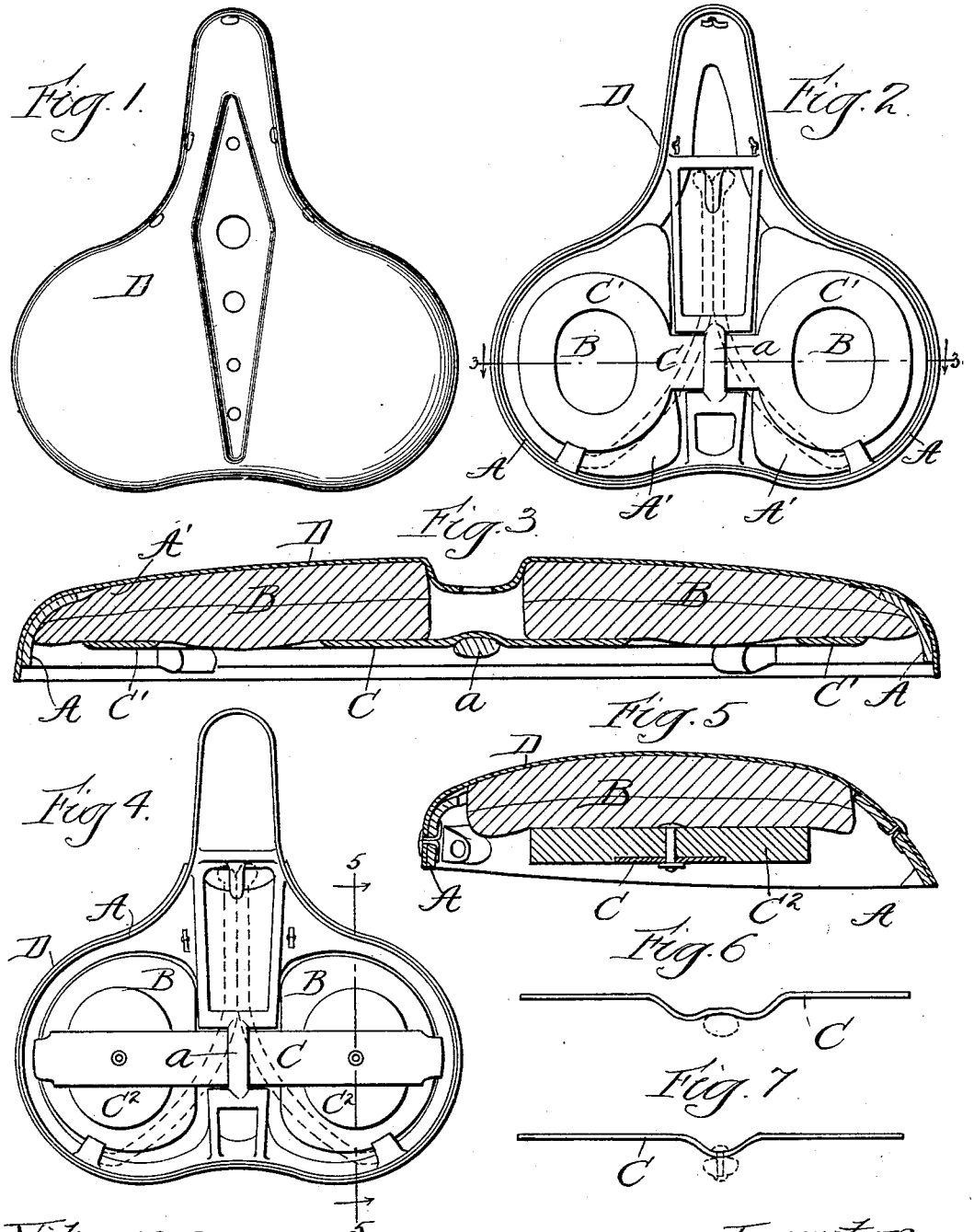

JESSE D. MOORE, OF CHICAGO, ILLINOIS.

BICYCLE-SADDLE.

SPECIFICATION forming part of Letters Patent No. 630,911, dated August 15, 1899.

Application filed February 20, 1897. Serial No. 624,420. (No model.)

*To all whom it may concern:*

Be it known that I, JESSE D. MOORE, a citizen of the United States of America, residing at Chicago, in the county of Cook and State of Illinois, have invented certain new and useful Improvements in Bicycle-Saddles, of which the following is a description.

Referring to the accompanying drawings, wherein like reference-letters indicate like or corresponding parts, Figure 1 is a plan view of my improved saddle. Fig. 2 is a bottom view of the same, the supporting-rods being broken away to show the construction. Fig. 3 is a vertical section in line 3 3 of Fig. 2. Fig. 4 is a similar view to Fig. 2, showing a modified form. Fig. 5 is a section 5 5 of Fig. 4, and Figs. 6 and 7 show modified forms of spring.

In bicycle-saddles it is important that the weight of the rider shall be supported in such a manner that the shock caused by riding over an obstruction or a rough road will not be transmitted directly to the rider, but will be cushioned in some manner—as, for example, by transmission through a spring alone or a spring and cushion combined. It is also important that the saddle be so constructed that at no time can the delicate parts or organs of the body come in violent contact with the saddle.

The object of my invention is to secure the above desirable features in a saddle of simple and economical construction.

To this end my invention consists, broadly, in supporting a pad or cushion on either side on the end of a centrally-supported transverse spring in such a manner that the pads or cushions will have a vertical play, the frame being peculiarly constructed for this purpose.

It also consists in so constructing the frame and positioning the pads or cushions that the buttocks of the rider rest thereon in such a manner as to raise the delicate parts of the rider substantially free from the saddle.

Referring now to the drawings, A represents the frame of the saddle, provided on either side with an opening A', preferably extending entirely through the frame and within which is arranged a pad or cushion B, supported on the end of the spring C, which in turn is supported between its ends on a part of the frame provided for that purpose, as the bar $a$. The spring is thus supported in such a manner that the pads B may have a vertical play through the openings A' of the frame. In the form shown in Figs. 2 and 3 the ends of the spring are enlarged, as at C', to support a pad or cushion of felt or other suitable material. In the form shown in Figs. 4 and 5 an extra disk $C^2$, secured in any preferred manner, may be used to so support the pad or cushion.

The saddle is covered with some suitable material, preferably with leather D, Fig. 1, and is preferably depressed in the center, as shown, for the purpose of coacting with the spring to relieve the rider from any undue pressure upon delicate parts of the body.

The form and elasticity of the spring may be varied in many ways to secure the results described; but to secure the best results it should be so formed and of such strength as to so arrange the pads or cushions with relation to the frame that the weight of the rider will not depress them sufficiently to permit the body to come with any disagreeable pressure on the frame. The result is that the rider is easily and naturally supported on spring pads or cushions without shock or injury to the delicate parts of the body liable to injury.

After pointing out my invention it is obvious various immaterial modifications may be made without departing from the spirit of my improvement, and I do not wish to be understood as limiting myself to the exact form of construction shown.

Having thus described my invention, what I claim as new, and desire to secure by Letters Patent, is—

1. A bicycle-saddle, consisting of a suitable frame provided on either side with a vertical opening, in combination with a transverse spring supported between its ends, and positioned so that the ends of the spring will be so located in the openings of the frame that the buttocks of the rider will rest thereon, substantially as described.

2. A bicycle-saddle, consisting of a suitable frame provided on either side with a vertical opening, in combination with a transverse spring supported between its ends, and pads or cushions supported upon the ends of the spring, in line with said openings, substantially as described.

3. A bicycle-saddle, consisting of a suitable frame, provided on either side with a vertical opening, and a flexible cover, in combination with a transverse spring supported between its ends, and pads or cushions supported on the ends of the spring in line with said openings, substantially as described.

JESSE D. MOORE.

Witnesses:
JOHN W. HILL,
L. A. GARDINER.